US006539716B2

(12) United States Patent
Finger et al.

(10) Patent No.: US 6,539,716 B2
(45) Date of Patent: Apr. 1, 2003

(54) INTERNAL COMBUSTION ENGINE WITH EXHAUST GAS TURBOCHARGER AND COMPOUND POWER TURBINE

(75) Inventors: Helmut Finger, Leinfelden-Echterdingen (DE); Peter Fledersbacher, Stuttgart (DE); Siegfried Sumser, Stuttgart (DE); Friedrich Wirbeleit, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/974,708

(22) Filed: Oct. 10, 2001

(65) Prior Publication Data

US 2002/0053207 A1 May 9, 2002

(30) Foreign Application Priority Data

Oct. 10, 2000 (DE) .......................... 100 49 912

(51) Int. Cl.$^7$ .............................. F02B 33/44
(52) U.S. Cl. ..................... 60/605.2; 60/614; 60/624
(58) Field of Search ................ 60/605.2, 624, 60/614, 280; 123/321, 322, 323

(56) References Cited

U.S. PATENT DOCUMENTS

| 4,897,998 | A | * | 2/1990 | Sekiyama et al. ............ 60/624 |
| 5,079,913 | A | * | 1/1992 | Kishishita ..................... 60/624 |
| 5,884,482 | A | * | 3/1999 | Lange et al. .................. 60/624 |
| 6,286,312 | B1 | * | 9/2001 | Bertilsson .................... 60/624 |

| 2001/0035171 | A1 | * | 11/2001 | Kim et al. ................. 60/605.2 |

FOREIGN PATENT DOCUMENTS

| DE | 35 22 595 | 1/1986 |
| DE | 690 01 636 T2 | 10/1990 |
| DE | 195 16 971 | 11/1995 |

* cited by examiner

Primary Examiner—Thomas Denion
Assistant Examiner—Thai-Ba Trieu
(74) Attorney, Agent, or Firm—Klaus J. Bach

(57) ABSTRACT

In an internal combustion engine including an exhaust gas turbocharger and a compound power turbine connected to the crankshaft of the engine and an exhaust gas recirculation system extending between the engine exhaust duct upstream of the exhaust gas turbine and the intake duct downstream of the compressor of the exhaust gas turbocharger, the exhaust gas turbine and the compound power turbine have a size relationship determined by the power absorption capability φ of each turbine such that:

$$\phi = \dot{m}\frac{\sqrt{T}}{p}$$

wherein: $\dot{m}$ is the exhaust gas mass flow rate through the turbine,
T is the exhaust gas temperature at the turbine inlet, and
p is the exhaust gas pressure at the turbine outlet
and the maximal compound power turbine absorption capability exceeds the maximal absorption capability of the exhaust gas turbine.

7 Claims, 3 Drawing Sheets

INTERNAL COMBUSTION ENGINE WITH EXHAUST GAS TURBOCHARGER AND COMPOUND POWER TURBINE

BACKGROUND OF THE INVENTION

The invention resides in an internal combustion engine with exhaust gas turbocharger and compound power turbine, which is coupled to the crankshaft of the engine and is disposed downstream of the exhaust gas turbocharger so as to receive the exhaust gas therefrom to be driven thereby.

Such an internal combustion engine is known from DE 195 16 971 A1. It discloses an internal combustion engine with an exhaust gas turbine arranged in the exhaust duct and connected to a compressor, which is disposed in the intake duct of the engine. Downstream of the exhaust gas turbine in the exhaust gas duct is a compound power turbine, which is coupled to the crankshaft of the engine by a transmission. The compound turbine permits the utilization of the residual energy contained in the exhaust gas after passage through the exhaust gas turbine and to transfer this energy to the crankshaft of the engine as a positive drive moment or as a negative brake moment. The total efficiency of the engine is improved by such a series arrangement of exhaust gas turbine and compound power turbine.

With the internal combustion engine as disclosed in DE 195 16 971 A1, the engine drive and engine braking power can be increased. However, a reduction of the $NO_x$ emissions, which can be achieved by exhaust gas recirculation, is not provided for and cannot be easily realized without detrimentally affecting the engine efficiency since the pressure loss caused by the exhaust gas recirculation in the exhaust pipe ahead of the exhaust gas turbine prevents the generation of any significant power in the compound power turbine.

DE 195 16 911 A1 discloses no possibility for solving the conflict between reduced emissions on one hand and good engine efficiency on the other.

It is the object of the present invention to provide an internal combustion engine with an exhaust gas turbocharger and a compound power turbine, which provides for a low level of noxious emissions and a good overall efficiency during engine power operation and also during engine braking operation.

SUMMARY OF THE INVENTION

In an internal combustion engine including an exhaust gas turbocharger and a compound power turbine connected to the crankshaft of the engine and an exhaust gas recirculation system extending between the engine exhaust duct upstream of the exhaust gas turbine and the intake duct downstream of the compressor of the exhaust gas turbocharger, the exhaust gas turbine and the compound power turbine have a size relationship determined by the power absorption capability $\phi$ of each turbine such that:

$$\phi = \dot{m}\frac{\sqrt{T}}{p}$$

wherein: —$\dot{m}$— is the exhaust gas mass flow rate through the turbine,

T is the exhaust gas temperature at the turbine inlet, and p is the exhaust gas pressure at the turbine outlet and the maximal gas turbine exceeds the maximal absorption capability of the exhaust gas turbine.

The exhaust gas turbine and the compound power turbine are provided in a certain size relationship which is determined mainly by the maximum power absorption capacity of each turbine from a known relationship depending on the exhaust gas mass flow through the turbine, a square root function of the temperature at the turbine inlet and a reciprocal value of the pressure at the turbine inlet. The maximum absorption capability is determined for the exhaust gas turbine and also for the compound power turbine, wherein the size ratio of exhaust gas turbine and compound power turbine is so established that the maximum power absorption capability of the compound power turbine exceeds the maximum power absorption capability of the exhaust gas turbine. If the turbines are sized in accordance with this dimensioning rule a high exhaust gas back pressure between the cylinder outlet of the internal combustion engine and the exhaust gas turbine can be achieved as it is required for exhaust gas recirculation and, consequently, for a reduction of nitrogen oxides in the exhaust gas. If this dimensioning rules is observed, the exhaust gas turbine is further small enough to cause a sufficient exhaust gas backup and a corresponding exhaust gas back pressure as it is needed for the exhaust gas recirculation.

On the other hand, the exhaust gas turbine may be sized large enough to generate a high charge pressure in the air intake duct of the internal combustion engine as it is needed for a high engine power output as well as for a good engine braking performance.

In a preferred embodiment, the absorption capability of the exhaust gas turbine is about 45% to 55% of the maximum power absorption capability of the compound power turbine. This size ratio is considered to be an optimum solution of the conflicting aims to provide, on one hand, a small exhaust gas turbocharger which can generate a high back pressure and, on the other hand, a large exhaust gas turbocharger which can generate a large intake air pressure. With the additional serially arranged compound power turbine the overall engine efficiency can be improved since the compound power turbine generates additional drive power and additional drive torque when the engine is operating and also, during braking operation, a braking torque which is applied directly to the crankshaft.

In a preferred embodiment, the exhaust gas turbine is provided with a variable vane structure for adjusting the effective turbine inlet flow cross-section. The variable vane structure (turbine geometry) permits to control the power setting during engine power operation and also during engine braking operation. In connection with the exhaust gas recirculation, an exhaust gas back pressure which exceeds the charge air pressure and consequently exhaust gas recirculation can be achieved over a large operating range by an adjustment of the turbine geometry to a back-up position which optimizes the turbine inlet flow cross-section. A deterioration of the charge change is compensated for by the power generated by the serially arranged compound power turbine so that, in addition to the reduction of the $NO_x$ emissions, the overall efficiency can be maintained with exhaust gas recirculation or even improved.

The compound power turbine is preferably so designed that, in the essential engine performance graph areas, the engine can be operated close to the optimal efficiency. To this end, the fast speed number of the compound power turbine defined as quotient of circumferential speed at the turbine wheel inlet and isentropic speed, is, at full engine load, in the area of 0.55 to 0.60. The isentropic speed is that theoretical speed, which is obtained if the turbine pressure drop is converted into flow speed without losses. With such a dimensioning, the compound power turbine operates, upon an engine torque reduction, also without changes of the variable geometry in the area of optimal efficiency with a fast speed number of about 0.7. With a further reduction of the engine torque, the fast speed of the compound power turbine increases at constant torque engine speed above the optimal value. With an adjustment of the variable turbine geometry toward opening however a decrease of the efficiency of the compound power turbine can be counteracted by an increase of the pressure drop by means of the compound power turbine.

With the use of a variable turbine geometry in the exhaust gas turbine, the maximum absorbability of the exhaust gas turbine can be provided for a maximally opened variable turbine geometry as well as for a back-up position with minimum flow cross-section. With maximally opened turbine geometry, the maximal absorbability is preferably 45% to 55% of the maximal absorbability of the compound power turbine. For the back-up position, it has been found to provide a maximal absorbability of the exhaust gas turbine of at least 10% of the maximal absorbability of the compound power turbine in order to achieve, particularly under engine braking operation, a significant engine braking effect at lower engine speeds.

Further advantages and embodiments of the invention will become apparent from the following description of a particular embodiment thereof on the basis of the accompanying drawings.

DESCRIPTION OF A PARTICULAR EMBODIMENT

Figure 1:
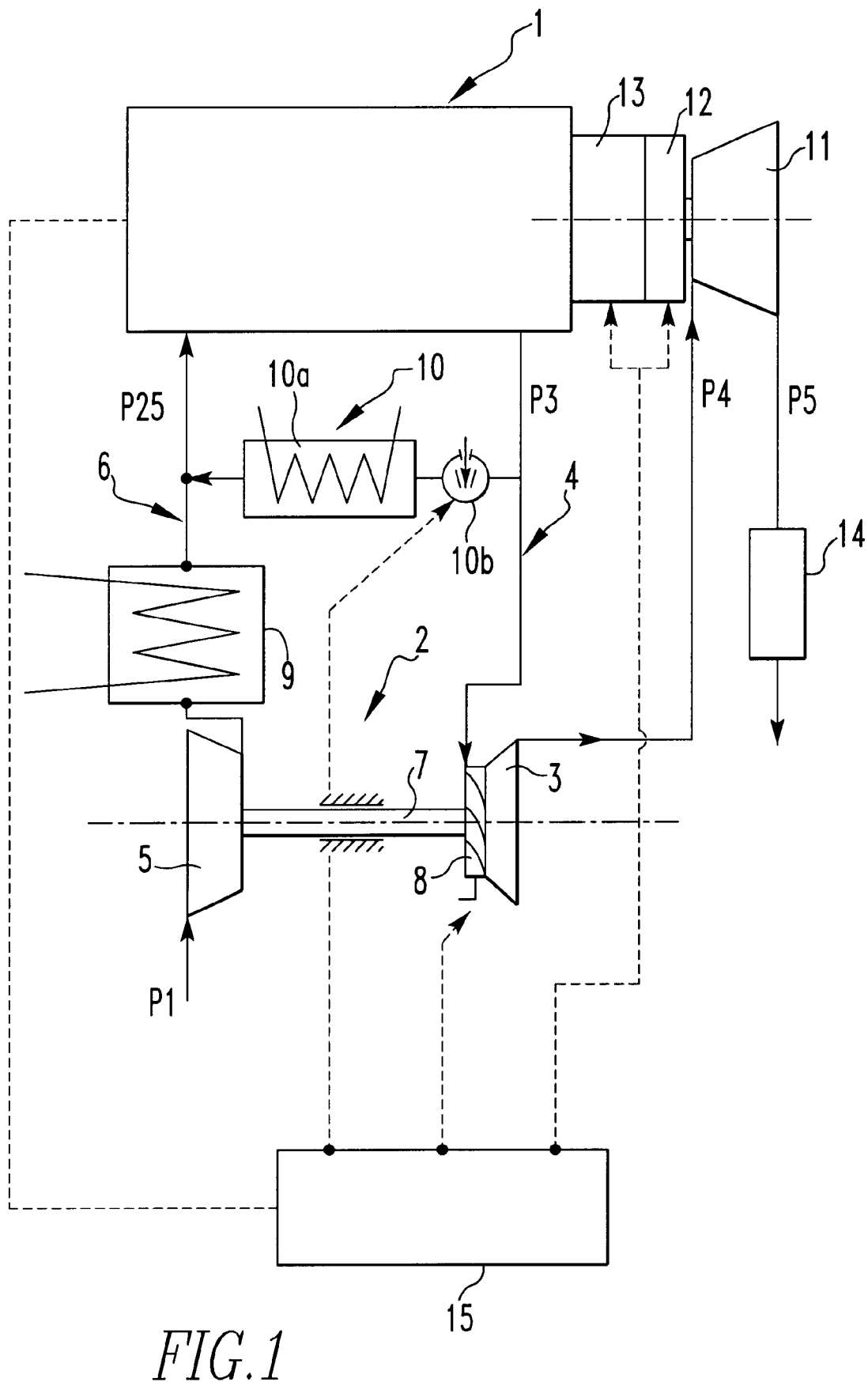
FIG. 1 is a schematic representation of an internal combustion engine with a turbocharger and a compound power turbine.

The internal combustion engine 1 as shown in FIG. 1 includes an exhaust gas turbocharger 2 with an exhaust gas turbine 3 in the exhaust duct 4 and a compressor 5 in the intake duct 6. The compressor 5 is driven by the exhaust gas turbine 3 by way of a shaft 7. The exhaust gas turbine 3 is provided with variable turbine geometry 8 that is for example an adjustable inlet vane structure, especially a radial guide structure with adjustable vanes. The variable turbine geometry is adjustable between an effective inlet flow cross-section which minimized inlet flow providing for exhaust gas back up and an effective inlet flow cross-section in which the turbine inlet flow passages are fully opened for maximum exhaust gas flow. Downstream of the compressor 5, the engine intake duct 6 includes a charge air cooler 9. Furthermore, an exhaust gas recirculation arrangement 10 is provided including a line section interconnecting the exhaust gas duct 4 upstream of the exhaust gas turbine 3 and the intake duct 6 downstream of the charge air cooler 9. The line section includes also a cooler 10a and a recirculation control valve 10b.

Downstream of the exhaust gas turbine 3, the exhaust gas duct 4 leads to a compound power turbine 11 through which the exhaust gas from the exhaust gas turbine is conducted and which is driven thereby. The compound power turbine 11 is connected to the crankshaft of the engine by way of a clutch 12 and a transmission 13. The clutch 12 may be arranged before or after the transmission 13, whereby a drive torque as well as a braking torque can be transferred from the compound power turbine 11 to the crankshaft of the engine. Downstream of the compound power turbine 11, a particle filter 14 is disposed in the exhaust gas duct 4.

The adjustable components, particularly the exhaust gas recirculation valve 10b of the exhaust gas recirculation arrangement 10, the variable turbine geometry 8, the clutch 12 and the transmission 13 between the compound power turbine 11 and the engine crankshaft are controllable by a control unit 15 depending on the engine operating conditions.

When the engine is operating under power, the combustion air is inducted with the ambient pressure P1 and is compressed in the compressor 5 to an increased charge air pressure $P_{2S}$ and supplied to the air intake passages of the internal combustion engine. At the exhaust side of the engine, there is in the exhaust duct 4 between the cylinder outlet passages and the exhaust gas turbine 3 an exhaust gas back pressure $p_3$, which is lowered in the exhaust gas turbine 3 to the pressure $p_4$. Downstream of the exhaust gas turbine 3, the exhaust gas is supplied to the compound power turbine 11 with this pressure $p_4$ and its pressure is further reduced in the compound power turbine 11 to a residual pressure $p_5$.

In order to achieve, during operation or the engine under power, a reduction of the $NO_x$ content in the exhaust gas, an increased exhaust gas back pressure $p_3$ can be provided for under certain engine operating conditions by a corresponding setting of the variable turbine geometry 8 such that the exhaust gas back pressure $p_3$ exceeds the charge air pressure $P_{2S}$. As a result, there will be a pressure difference between the exhaust duct 4 and the air intake duct 6, which can be utilized for the exhaust gas recirculation. In addition to providing for a pressure difference between the exhaust duct and the air intake duct permitting exhaust gas recirculation, the variable turbine geometry may also be used for controlling the positive engine power output during engine power operation and the negative braking power during engine braking operation.

Figure 2:
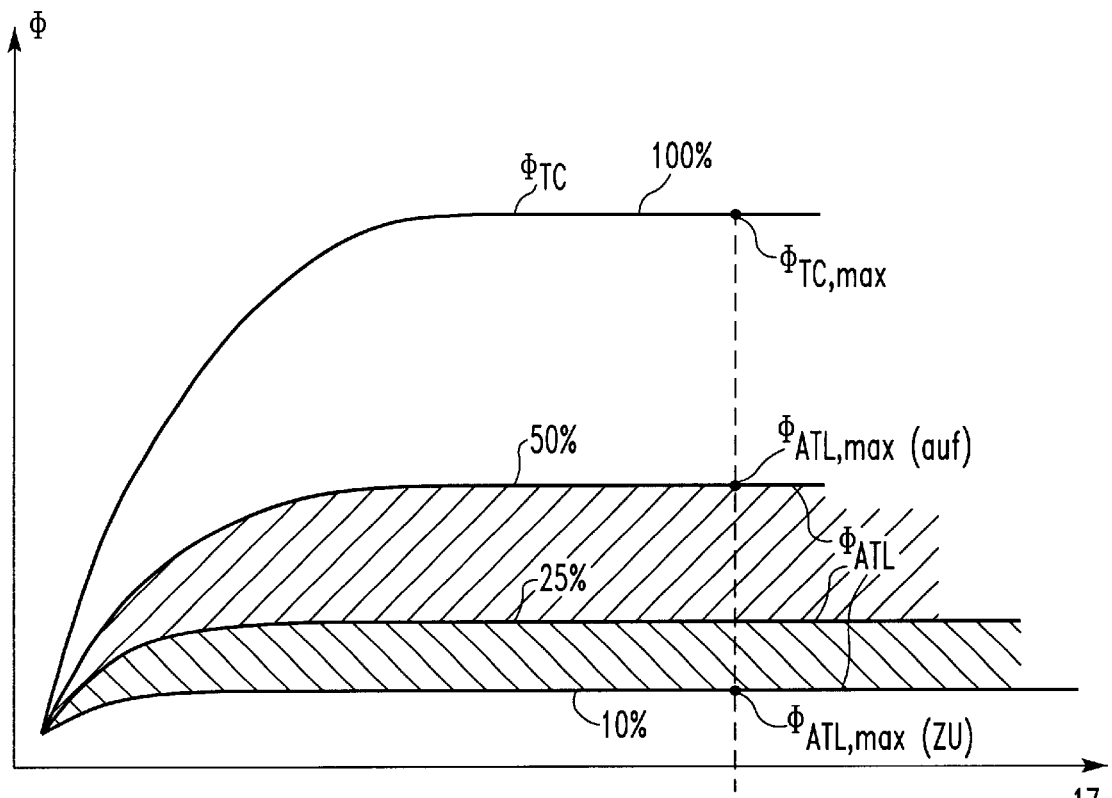
FIG. 2 is a diagram showing the absorbability curves or respectively, flow rate of the turbine depending on the pressure drop, for the compound power turbine and the exhaust gas turbine.

The diagram of FIG. 2 shows the flow capacity or, respectively, the absorption capability $\phi$ is defined by the relation:

$$\phi = \dot{m}\frac{\sqrt{T}}{p}$$

Wherein, —$\dot{m}$— is the exhaust gas mass flow rate through the respective turbine, T is the temperature at the turbine inlet and p is the pressure at the turbine inlet. In accordance therewith, the absorption capability $\phi_{ATc}$ of the exhaust gas turbine 3 depends on the exhaust gas mass flow m through the exhaust gas duct 4, the turbine inlet temperature $T_3$ and the exhaust gas back pressure $p_3$. The absorption capability $\phi_{Tc}$ of the compound power turbine depends on the exhaust gas mass flow m through the exhaust duct, the turbine inlet temperature $T_4$ and the exhaust gas pressure $p_4$.

With an optimal dimensioning, the maximal absorption capability $\phi_{ATLmax}$ of the exhaust gas turbine whose variable turbine geometry is in a fully open position (indicated in FIG. 2 with "auf"), at 45% to 55%, particularly about 50% of the maximal absorption capability $\phi_{Tc,max}$ or the compound power turbine. The maximal absorption capability $\phi_{TC,max}$ or, respectively, $\phi_{ATL,max}$ is determined in blocking range of the absorption capability curves.

As a further design rule, the minimum size for the maximal absorption capability $\phi_{ATLmax}$ of the exhaust gas turbine may be provided, whose variable turbine geometry is in blocking position (indicated in FIG. 2 by "zu"). In this end position, the maximal absorption capability $\phi_{ATLmax}$ of the exhaust gas turbine is at least 10% of the maximal absorption capability $\phi_{Tcmax}$ of the compound power turbine.

The range of 10% to 25% of the maximal absorption capability $\phi_{ATCmax}$ of the exhaust gas turbine in relation to the maximal absorption capability $\phi_{Tcmax}$ of the compound power turbine is particularly suitable for engine braking operation. The range between 25% and 50% in contrast is used for the engine power operation.

Figure 3:
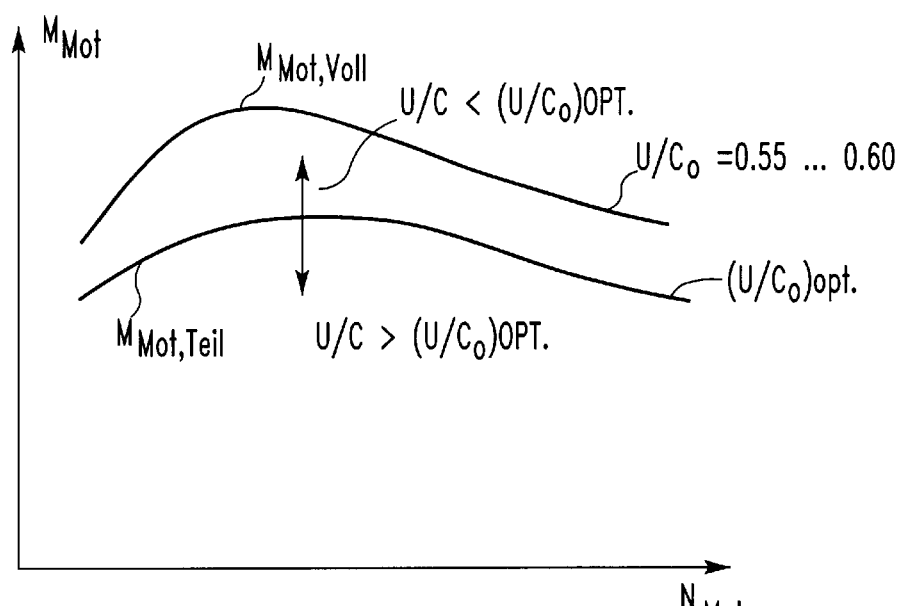
FIG. 3 is a diagram showing the engine torque depending on the engine speed.
Figure 4:
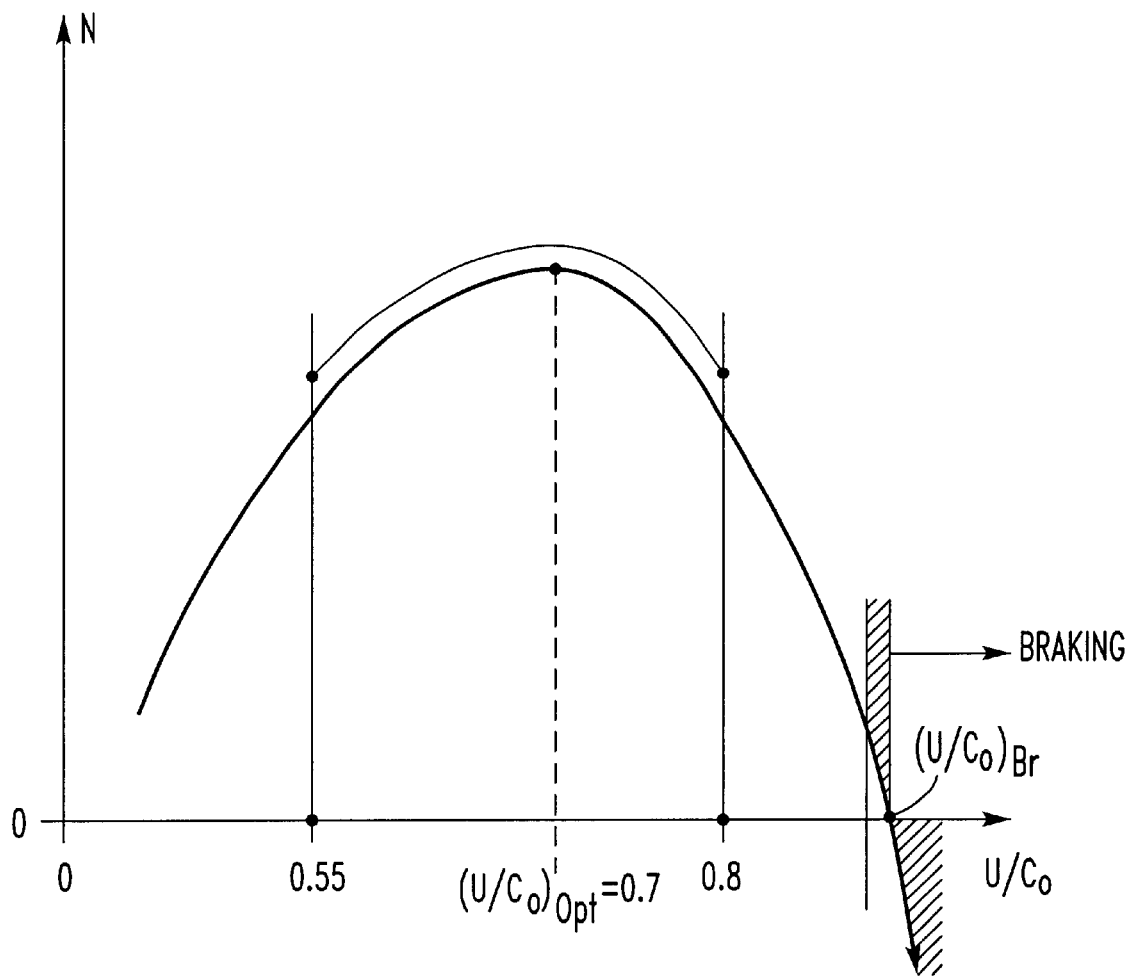
FIG. 4 is a diagram showing the turbine efficiency of the compound power turbine depending on the high speed number.

In the diagram of FIG. 3, the different curves for the engine torque $M_{Mot}$ are shown depending on the engine speed. The upper curve $M_{Movoll}$ indicates the maximum engine torque under full load. Below the full load curve, the engine torque $M_{MovTeil}$ is indicated for an operation of the internal combustion engine under partial load. To each engine torque curve a high-speed operation number u/co is assigned which is defined as the quotient of circumferential speed u of the turbine wheel in the area of the turbine inlet and the isentropic speed $c_o$ which corresponds to the theoretical speed that occurs when the pressure drop across the turbine is converted to gas flow speed without any losses. The high speed number $u/c_o$ can be provided for each turbine. In an optimal design, the high-speed number $u/c_o$ for the compound power turbine, when the engine is operating under full load, has a value of about 0.55 to 0.60. This value of the high-speed number is assumed by the compound power turbine for the represented engine torque performance curve under full load $M_{Mot\ voll}$. When the engine torque is lowered for example, from full load toward the engine torque performance curve $M_{Mot\ Teil}$ disposed for partial load that is below the full load engine torque performance curve, the high speed number $u/c_o$ of the compound power turbine first increases to an optimal value $(u/c_o)_{opt}$, which is about 0.7. With the optimal high speed number $(u/c_o)_{opt}=0.7$, the turbine efficiency of the compound power turbine is at a maximum as it is shown in FIG. 4. Above the optimal high speed number $(u/c_o)_{opt}$ (in FIG. 3, the area below the engine performance curve for partial load operation $M_{Mot\ Teil}$) the turbine efficiency η drops off. This is also true for high speed numbers which are smaller than the optimal high speed number $(u/c_o)_{opt}$ (in FIG. 3, the area between the engine torque performance curves $M_{Mot\ voll}$ and $M_{Mot\ Teil}$).

With a design of the compound power turbine for a high speed number $u/c_o$ of about 0.55 to 0.60 under full engine load, the range of about 0.55 to 0.8, which is characterized by a high turbine efficiency η is available for a large load range as shown in FIG. 4.

In order to be able to generate in the compound power turbine a braking torque during engine braking operation, which is transmitted to the crankshaft of the engine, a negative efficiency η of the compound power turbine is to be provided. This range is characterized in the diagram of FIG. 4 by the intersection of the efficiency curve with the base, which intersection indicates the brake high speed number $(u/c_{oBr})$, and by all the high speed numbers disposed above.

The braking high speed number $(u/c_o)_{Br}$ has for example a value of 1.1. In this braking range, a braking torque is generated in the compound power turbine, for example, by a reduction of the effective turbine flow cross section in the exhaust gas turbine as a result of a corresponding setting of the variable turbine geometry, whereby the exhaust gas back pressure is increased upstream of the exhaust gas turbine and the turbine discharge pressure is decreased so that a low pressure exhaust gas is supplied to the compound power turbine. As a result, the isentropic speeds $c_o$ at the compound power turbine are reduced such that the high speed number assumes higher values. High circumferential speeds u and low isentropic speeds $c_o$ in the compound power turbine result in an extremely large flat gas admission which causes a rearward impulse at the turbine blade entrance areas providing for a wheel braking impulse.

What is claimed is:

1. An internal combustion engine having a crankshaft and including an exhaust gas turbocharger and a compound power turbine coupled to said crankshaft, said exhaust gas turbocharger comprising an exhaust gas turbine mounted in an exhaust gas duct of said engine, a compressor operatively connected to said exhaust gas turbine and being mounted in an intake duct of said engine, an exhaust gas recirculation system including a control valve extending between said exhaust duct upstream of said turbine and said intake duct downstream of said compressor for the controlled return of exhaust gas to the intake duct of said engine, and a compound power turbine arranged in said exhaust duct downstream of said exhaust gas turbine and being operatively connected to said crankshaft, said exhaust gas turbine and said compound power turbine having a size relationship determined by the power absorption capability φ of each turbine in accordance with the relationship:

$$\phi = \dot{m}\frac{\sqrt{T}}{p}$$

wherein φ is the absorption capability,
$\dot{m}$ is the exhaust gas mass flow rate through the turbine,
T is the exhaust gas temperature at the turbine inlet,
and, p is the exhaust gas pressure at the turbine outlet, and the maximal absorption capability $\phi_{TC,max}$ of the compound power gas turbine exceeds the maximal absorption capability $(\phi_{ATL,max})$ of the exhaust gas turbine.

2. The internal combustion engine according to claim 1, wherein the maximal absorption capability $(\phi_{ATL,max})$ of the exhaust gas turbine has 45% to 55% of the maximal absorption capability of the compound power turbine.

3. The internal combustion engine according to claim 1, wherein said exhaust gas turbine includes a variable turbine geometry for controlling the effective turbine flow cross-section.

4. The internal combustion engine according to claim 3, wherein said exhaust gas turbine has a variable geometry and the maximal absorption capability $(\phi_{ATL,max})$ of the exhaust gas turbine with open variable turbine geometry has 45% to 55% of the maximal absorption capability of the compound power turbine.

5. The internal combustion engine according to claim 4, wherein the maximal absorption capability $(\phi_{ATL,max})$ of the exhaust gas turbine with the variable turbine geometry in blocking position is at least 10% of the maximal absorption capability $(\phi_{Tcmax})$ of the compound power turbine.

6. The internal combustion engine according to claim 1, wherein said compound power turbine is so dimensioned that a high speed number $(u/c_o)$ of the compound power turbine defined as quotient of circumferential speed (u) at the turbine wheel inlet and the isentropic speed $(c_o)$ at full engine power has a value of 0.55 to 0.60.

7. The internal combustion engine according to claim 6, wherein, during engine braking operation, the high speed number $(u/c_o)$ is adjusted to a value greater than 1.0, whereby the compound power turbine has a negative efficiency for braking said crankshaft.

* * * * *